United States Patent
Kusumi et al.

(10) Patent No.: US 12,232,002 B2
(45) Date of Patent: Feb. 18, 2025

(54) DYNAMIC SETTING OF SLICES

(71) Applicant: RAKUTEN MOBILE, INC., Tokyo (JP)

(72) Inventors: Jin Kusumi, Tokyo (JP); Jin Nakazato, Tokyo (JP); Kenichiro Aoyagi, Tokyo (JP); Takuya Miyazawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/801,555

(22) PCT Filed: Apr. 26, 2022

(86) PCT No.: PCT/JP2022/018964
§ 371 (c)(1),
(2) Date: Aug. 23, 2022

(87) PCT Pub. No.: WO2023/209826
PCT Pub. Date: Nov. 2, 2023

(65) Prior Publication Data
US 2024/0224011 A1    Jul. 4, 2024

(51) Int. Cl.
*H04W 4/50*        (2018.01)
*H04L 41/0894*    (2022.01)
(Continued)

(52) U.S. Cl.
CPC .......... *H04W 4/50* (2018.02); *H04L 41/0894* (2022.05); *H04L 41/50* (2013.01); *H04L 67/141* (2013.01); *H04W 48/18* (2013.01); *H04W 76/10* (2018.02)

(58) Field of Classification Search
None
See application file for complete search history.

(56) References Cited

U.S. PATENT DOCUMENTS

2019/0357136 A1 * 11/2019 Li .................. H04W 48/18

FOREIGN PATENT DOCUMENTS

JP    2020-509635 A      3/2020
WO   WO-2018171375 A1 *  9/2018  ............ H04W 48/08

OTHER PUBLICATIONS

"3rd Generation Partnership Project; Technical Specification Group Services and System Aspects; System architecture for the 5G System (5GS); Stage 2 (Release 17)", 3GPP TS23.501, V17.3.0, Dec. 2021, 559 pages.

(Continued)

*Primary Examiner* — Lance Leonard Barry
(74) *Attorney, Agent, or Firm* — Sughrue Mion, PLLC

(57) ABSTRACT

A communication device provided with a chip set and one or more processors. The one or more processors acquire, from a preferred application with which a provided service is to be received via a communication network, a requirement for receiving the provided service, refer to a policy file to select a slice satisfying the requirement from among slices provided in the communication network, generate a first communication connection request associated with an application corresponding to the selected slice, the first communication request being independent from the preferred application with which the provided service is to be received via the communication network, and notify the chip set of the first communication connection request. Upon acquiring the first communication connection request, the chip set sends, to the communication network, a second communication connection request for performing communication associated with the application with which the provided service is to be received.

16 Claims, 12 Drawing Sheets

(51) Int. Cl.
*H04L 41/50* (2022.01)
*H04L 67/141* (2022.01)
*H04W 48/18* (2009.01)
*H04W 76/10* (2018.01)

(56) References Cited

OTHER PUBLICATIONS

International Search Report of PCT/JP2022/018964 dated Jul. 5, 2022 [PCT/ISA/210].

* cited by examiner

FIG. 3

| Management ID | Application ID | Connection Destination Server Application URL | Permission for NW policy ID | Permission for server location | Other conditions |
|---|---|---|---|---|---|
| 1111 | 0001 | xxxxxxx1 | 01 | MEC1, MEC2 | ·When event being held, connect to MEC1<br>·Priority in order of MEC1, MEC2 |
| 1112 | 0001 | xxxxxxx2 | 03 | any | |
| 1113 | 0002 | xxxxxxx3 | 03 | MEC3 | |
| 1114 | 0003 | xxxxxxx3 | any | any | |

FIG.5

| Use Case | Requirements for Receiving Provided Service |
|---|---|
| Optimization (all freely selectable) | Request URL:xxxxxxx1<br>NW Policy ID:AUTO<br>Server location:AUTO |
| Only QoS1 (high-speed, best-effort) designated | Request URL:xxxxxxx2<br>NW Policy ID:01<br>Server location:AUTO |
| Only QoS2 (high-speed, guaranteed-bandwidth) designated | Request URL:xxxxxxx3<br>NW Policy ID:02<br>Server location:AUTO |
| Only QoS3 (low-speed, best-effort) designated | Request URL:xxxxxxx4<br>NW Policy ID:03<br>Server location:AUTO |
| Only QoS4 (low-speed, guaranteed-bandwidth) designated | Request URL:xxxxxxx5<br>NW Policy ID:04<br>Server location:AUTO |
| ... | ... |
| Only server location designated | Request URL:xxxxxxx6<br>NW Policy ID:AUTO<br>Server location:MEC1 |
| Only server location designated | Request URL:xxxxxxx7<br>NW Policy ID:AUTO<br>Server location:MEC2 |
| ... | ... |
| QoS and server location designated | Request URL:xxxxxxx8<br>NW Policy ID:01<br>Server location:MEC1 |
| ... | ... |

| Server location ID | NSSAI |
|---|---|
| MEC1 | 1 |
| MEC2 | 1, 2 |
| MEC3 | 3 |
| ... | ... |

FIG.8

| NW policy ID | NSSAI |
|---|---|
| 01 (high-speed, best-effort) | 1 |
| 02 (high-speed, guaranteed-bandwidth) | 2 |
| 03 (low-speed, best-effort) | 3, 4 |
| 04 (low-speed, guaranteed-bandwidth) | 5, 6 |
| ... | ... |

FIG.9

| Management ID | Condition | Permission for NW Policy ID | Permission for Server location |
|---|---|---|---|
| 1114 | RTT>5000msec | 01, 04 | MEC1, MEC2 |
| 1114 | Jitter>20msec | 01, 04 | MEC1, MEC2 |
| 1114 | Error rate>50% | 01, 04 | MEC1, MEC2 |

FIG.10

| NSSAI | Application ID |
|---|---|
| 1 | a0001(for eMBB) |
| 2 | a0002(for URLLC) |
| 3 | a0003(for MIoT) |
| ... | ... |

DYNAMIC SETTING OF SLICES

CROSS REFERENCE TO RELATED APPLICATIONS

This application is a National Stage of International Application No. PCT/JP2022/018964 filed on Apr. 26, 2022.

TECHNICAL FIELD

The present disclosure relates to dynamic setting of slices.

Fifth-generation (5G) mobile communication systems can provide various services. Non-Patent Document 1 defines high capacity (eMBB: enhanced Mobile BroadBand), ultralow latency (URLLC: Ultra-Reliable and Low Latency Communications), multiple connections (MIoT: Massive Internet of Things), and the like as types of services provided in 5G. These services have different SLAs (Service Level Agreements). Examples of SLA categories include latency time, bandwidth, and the like. In order to flexibly provide various services under different SLAs, 5G mobile communication systems employ network slicing technology. Network slicing technology involves constructing slices by taking into consideration the arrangement and line bandwidths of constituent elements in communication networks so that the SLAs can be satisfied. Slices are logical networks provided within the communication networks. The constituent elements in communication networks include, for example, NFs (Network Functions) in a RAN (Radio Access Network) and SNFs (Service Network Functions) in a CN (Core Network).

In some of the use cases of eMBB, URLLC, and MIoT in 5G, there is a demand to execute applications on servers at locations nearer to communication terminals. With the increase in such demand, multi-access edge computing (MEC), which is distributed architecture, has garnered interest recently. MEC is a distributed computing technique in which at least some of the processing is performed, for example, on an edge cloud constructed on an edge data center installed near a communication terminal instead of in a center cloud constructed in a central data center. In this way, processing load distribution is achieved by distributing, among multiple clouds, the processing for providing services to communication terminals.

There are cases in which the above-mentioned network slicing and MEC are combined to construct slices for establishing communication between communication terminals and applications constructed on edge clouds in MEC.

Slices are assigned slice IDs (NSSAI: Network Slice Selection Assistance Information) for identifying the slices. Communication devices normally request connection with communication networks by designating slice IDs that have been associated with services in advance. Non-Patent Document 1 defines SSTs (Slice Service Types) constituting NSSAI for the above-mentioned eMBB, URLLC, and MIoT (Table 5.15.2.2-1).

CITATION LIST

Patent Literature

Non-Patent Document 1: 3GPP TS23.501, V17.3.0 (2021-12)

SUMMARY OF INVENTION

Technical Problem

However, depending on the service, there are cases in which the services can be provided in multiple slices, and in order to handle such cases, there is a need for dynamically configuring slices.

The present disclosure was made in view of the above-described circumstances, and provides the dynamic configuration of slices.

Solution to Problem

A communication device according to one embodiment of the present disclosure comprises a chip set and one or more processors.

The chip set is configured to manage correspondence relationships between applications and slices provided in a communication network, and upon acquiring a first communication connection request for receiving a provided service via the communication network, to send, to the communication network, a second communication connection request for performing, via a corresponding slice, communication associated with an application with which the provided service is to be received, based on the correspondence relationships.

The one or more processors acquire, from a preferred application with which the provided service is to be received via the communication network, a requirement for receiving the provided service, and refer to a policy file to select a slice satisfying the requirement from among one or more slices provided in the communication network.

Additionally, the one or more processors generate the first communication connection request associated with an application corresponding to the selected slice and not with the preferred application with which the provided service is to be received via the communication network.

Additionally, the one or more processors notify the chip set of the generated first communication connection request.

A slice configuration method according to an embodiment of the present invention involves acquiring, from a preferred application with which a provided service is to be received via the communication network, a requirement for receiving the provided service, and referring to a policy file to select a slice satisfying the requirement from among one or more slices provided in the communication network.

Additionally, the slice configuration method also involves generating a first communication connection request associated with an application corresponding to the selected slice and not with the preferred application with which the provided service is to be received via the communication network.

Additionally, the slice configuration method also involves notifying a chip set of the generated first communication connection request. The chip set is configured to manage correspondence relationships between applications and slices provided in the communication network, and upon acquiring the first communication connection request for receiving the provided service via the communication network, to send, to the communication network, a second communication connection request for performing, via a corresponding slice, communication associated with the application with which the provided service is to be received, based on the correspondence relationships.

A non-transitory, computer-readable medium according to an embodiment of the present invention stores a program.

When this program is read by a computer, one or more processors in the computer acquire, from a preferred application with which a provided service is to be received via the communication network, a requirement for receiving the provided service, and refer to a policy file to select a slice satisfying the requirement from among one or more slices provided in the communication network.

Additionally, the one or more processors generate a first communication connection request associated with an application corresponding to the selected slice and not with the preferred application with which the provided service is to be received via the communication network.

Additionally, the one or more processors notify a chip set of the generated first communication connection request. The chip set is configured to manage correspondence relationships between applications and slices provided in the communication network, and upon acquiring the first communication connection request for receiving the provided service via the communication network, to send, to the communication network, a second communication connection request for performing, via a corresponding slice, communication associated with the application with which the provided service is to be received, based on the correspondence relationships.

BRIEF DESCRIPTION OF DRAWINGS

FIG. 3 is a diagram illustrating an example of a permission table.

FIG. 5 is a diagram illustrating examples of correspondence between use cases and requirements for receiving provided services.

FIG. 8 is a diagram illustrating an example (correspondence table #2) of a correspondence table for NW policy IDs and NSSAIs.

FIG. 9 is a diagram illustrating an example of a switching conditions table.

FIG. 10 is a diagram illustrating an example of a correspondence table defining the correspondence between NSSAIs and application IDs.

DESCRIPTION OF EMBODIMENTS

Hereinafter, an embodiment of the present disclosure will be explained in detail with reference to the drawings.

EMBODIMENTS (Communication System 100)

Figure 1:
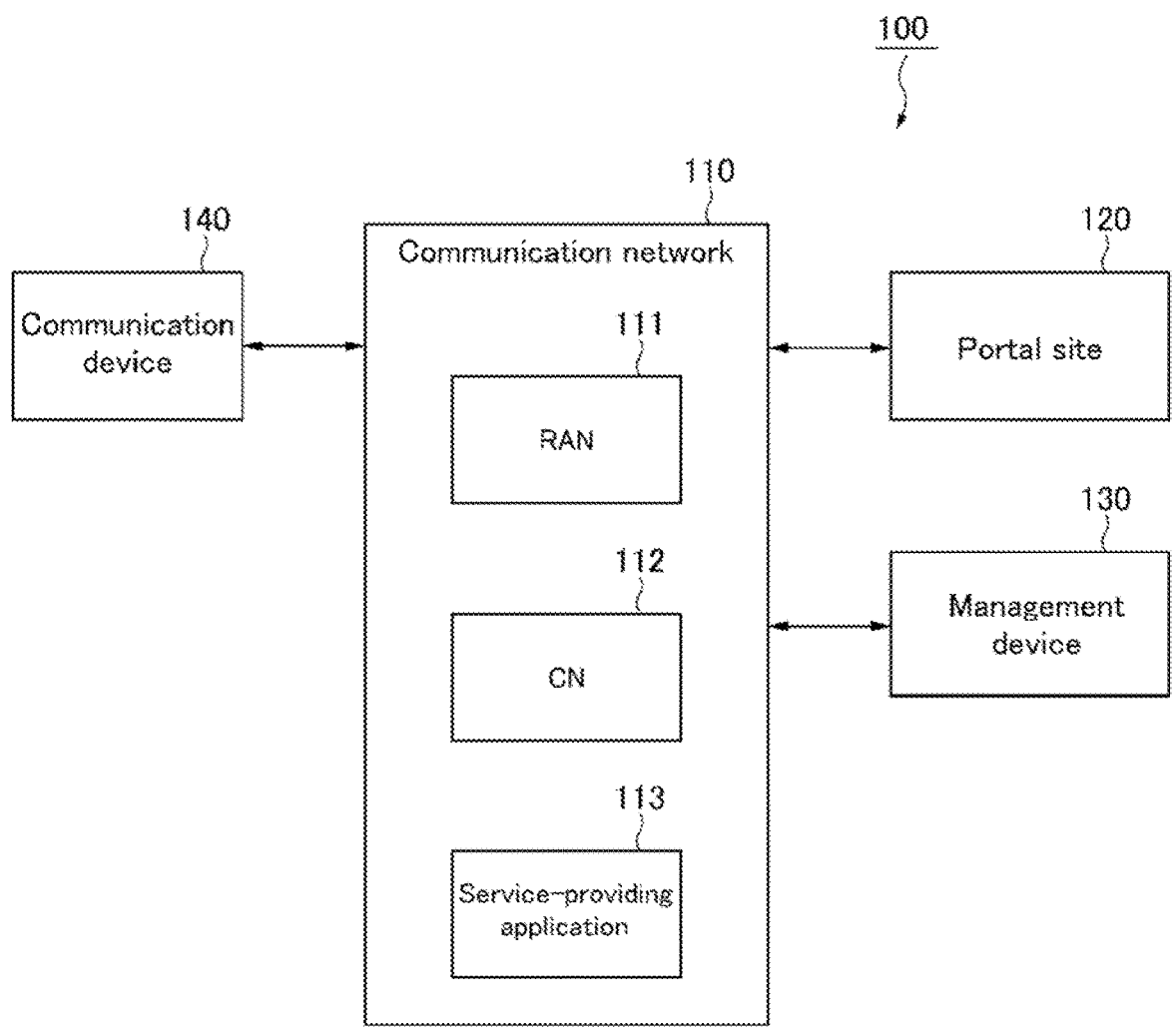
FIG. 1 is a diagram illustrating the structure of a communication system according to the present disclosure.

FIG. 1 is a diagram illustrating the structure of a communication system 100 according to the present disclosure.

The communication system 100 comprises a communication network 110, a portal site 120, a management device 130, and a communication device 140. In FIG. 1, for convenience of explanation, the portal site 120 and the management device 130 are illustrated outside the communication network 110. However, they may be located inside the communication network 110.

The communication network 110 may be a common communication network such as a 5G mobile communication system, and as shown in FIG. 1, comprises a RAN (Radio Access Network) 111 and a CN (Core Network) 112. The RAN 111, like common RANs, comprises a DU (Distributed Unit) and a CU (Central Unit) as NFs (Network Functions), and also comprises an RU (Radio Unit). The CN 112, like a common CN, comprises an SNF (Service Network Function) such as, for example, an AMF (Access and Mobility Management Function), an SMF (Session Management Function), a UPF (User Plane Function), and the like.

Additionally, the communication network 110 of the present embodiment further comprises an application (hereinafter referred to as a "service-providing application") 113 for providing a service. In FIG. 1, for convenience of explanation, the service-providing application 113 is shown separately from the RAN 111 and the CN 112. However, the service-providing application 113 need only be executed in a server or the like within the communication network 110, and said server may be located in the RAN 111 or located in the CN 112.

As indicated next, the constituent elements in the communication network 110 are physically located at antenna sites, edge data centers, regional data centers (RDCs), central data centers (CDCs), or public data centers (PDCs). Which of the above are to be used for constructing the respective constituent elements in the communication network 110 such as the NFs in the RAN 111, the SNFs in the CN 112, and the service-providing application 113 may be defined as appropriate, and they may be constructed in respectively different servers.

Figure 2:
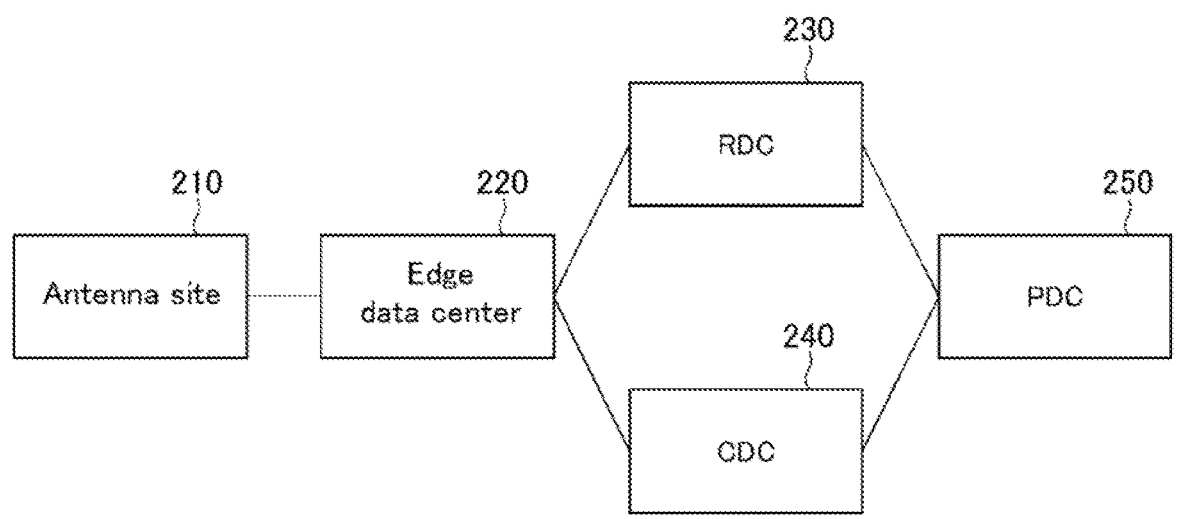
FIG. 2 is a diagram illustrating servers in which the constituent elements in a communication network may be located.

FIG. 2 is a diagram illustrating servers in which the constituent elements in the communication network 110 may be located.

Antenna sites 210 are located near RUs in the RAN 111.

Thousands of edge data centers 220 are located, in a distributed manner, in the area covered by the communication network 110. Edge clouds may be located in the edge data centers 220.

Tens of RDCs 230 are located, in a distributed manner, in the area covered, for example, by the communication network 110. If the area covered by the communication network 110 is the entire territory of Japan, then one or two RDCs 230 may be located in each prefecture.

Several CDCs 240 are located, in a distributed manner, in the area (for, example, Japan) covered by the mobile communication system 100.

PDCs 250 are located on the internet. Public clouds may be located in the PDCs 440.

By being arranged as indicated above, the communication distances with the communication device 140, which communicates with the following, are shorter in the order of the antenna sites 210, the edge data centers 220, the RDCs 230, the CDCs 240, and the PDCs 250. In other words, the antenna sites 210, the edge data centers 220, the RDCs 230, the CDCs 240, and the PDCs 250 are located, in the given order, closer to the edge with respect to the communication device 140 communicating therewith.

MEC (Multi-access Edge Computing) may, for example, be provided in servers at the antenna sites 210 and the edge data centers 220.

Returning to the explanation of FIG. 1, a portal site 120 registers a service and configures a policy relating to the service. Examples of the service include web distribution services, game-providing services, video distribution services, music distribution services, monitoring services, navigation services, automated driving services, email-providing services, and sensor services.

The policy indicates the quality (QOS: Quality of service) required for the service, connectable servers, etc. Registration and configuration are performed, for example, when triggered by a request from a vendor providing the service.

The portal site 120 configures one or more policies relating to the service.

The portal site 120 notifies the management device 130 of the one or more policies configured in connection with the service, for example, via the communication network 110. Additionally, the portal site 120 requests the management device 130 to prepare a slice and to deploy the service-providing application 113.

The management device 130 requests the communication network 110 to prepare a slice in accordance with the policy and to deploy the service-providing application 113.

The management device 130 acquires information regarding the results of the slicing and deployment from the communication network 110.

The management device 130 generates a policy file for the communication device 140. The policy file includes information on network policy defining communication connections to be made when an application executed on the communication device 140 (hereinafter sometimes referred to simply as the "application") receives the provided service from the service-providing application 113 via the communication network 110. Additionally, the policy file also includes information indicating where the service-providing application 113 is to be executed, in other words, information indicating which server in the communication network 110 is to execute the service-providing application 113.

The network policy, which indicates information regarding which slices or what quality of slices can be selected when an application executed on the communication device 140 utilizes a service, is described, in particular, as "Permission for NW policy". That is, the permitted network policy corresponds to the QoS. The location of a server to which the communication device 140 may connect when the application executed thereon utilizes the service is described as "Permission for server location". Multiple permitted network policies may be defined and multiple permitted server locations may be defined for a single application executed on the communication device 140.

The policy file is prepared or updated by the management device 130 periodically or at the times of service registration requests and update requests to the portal site 120. The newest policy configured for the service is reflected in the policy file. Details regarding the policy file will be described below.

The communication network 110, in response to a slice preparation and deployment request from the management device 130, prepares a slice and deploys a service-providing application 113. Examples of service-providing applications 113 include web distribution applications, game-providing applications, video distribution applications, music distribution applications, monitoring execution applications, navigation applications, automated driving applications, email-providing applications, and sensor execution applications.

The communication device 140, as mentioned above, comprises one or more applications for receiving provided services.

The communication device 140 need only be an ICT (Information and Communication Technology) device that can be executed by and that can communicate with an application. It may be a smartphone, a portable PC (Personal Computer) such as a tablet terminal, or a non-portable device such as a desktop PC.

Examples of the application include web browsers, game-playing applications, video-watching applications, music-listening applications, applications for checking monitoring results, navigation applications, automated driving applications, applications for sending and receiving email, and sensor monitoring applications.

The application does not necessarily correspond to a single service. For example, when watching a video (described as "video #1") from a certain video distribution service, instead of using a dedicated video-watching application (described as "video-watching application #1") provided by the vendor providing this video distribution service, an alternative video-watching application (described as "video-watching application #2") may be used. That is, instead of using a dedicated browser, which is video-watching application #1, for example, a general-purpose web browser may be used as video-watching application #2. When watching videos provided by different vendors on dedicated video-watching applications #1 provided by each vendor, there are cases in which the operations differ for each application, thus requiring a user to memorize the operations for each application separately. By using video-watching application #2, which can play videos on the cloud with a web browser regardless of the vendor, the user does not need to memorize the operations of video-watching applications #1 that differ for each vendor. If a web browser is used to watch videos as video-watching application #2 instead of a dedicated video-watching application #1, then there are also cases in which functions such as those for changing the playback speed or for repeated playback cannot be used. Nevertheless, among some users, rather than the ability to use these functions, there is a demand to be able to use the same video-watching application #2, regardless of the vendor providing the video, when watching videos. Thus, there are cases in which users wish to use applications that support multiple services.

Details regarding the communication device 140 will be described below.

(Policy File)

Next, the policy file will be explained. The policy file includes a permission table. The permission table includes the aforementioned information regarding permitted network policies and server locations.

The management device 130, for example, prepares a permission table when triggered by a service registration request from a vendor.

FIG. 3 illustrates an example of a permission table.

The permission table includes combinations of "Application ID", "Connection Destination Server Application URL", "NW policy ID" (Permission for NW Policy ID), and "server location" (Permission for server location). The "NW policy ID" (Permission for NW Policy ID) and the "Server Location" (Permission for server location) are permitted for communication connections between the relevant applications and service-providing applications 113. A management ID is assigned to each of these combinations.

(Application ID)

The "Application ID" is an identifier for identifying an application executed by the communication device 140, wherein the application is for receiving a provided service.

(Connection Destination Server Application URL)

The "Connection Destination Server Application URL" indicates a connection destination of the service-providing application.

(Permission for NW Policy ID)

The "Permission for NW Policy ID" is an identifier for indicating network policies permitted for a service.

Examples of NW policy IDs include the following.
  any: freely selectable
  01: high-speed, best effort
  02: high-speed, guaranteed-bandwidth
  03: low-speed, best effort
  04: low-speed, guaranteed-bandwidth If the "Permission for NW Policy ID" is "any", then this indicates that the permitted network policy is freely selectable.

If the "Permission for NW Policy ID" is "01", then this indicates that the permitted network policy is high-speed, best-effort. High-speed, best-effort tends to be used for high-capacity services in which some latency is permissible, and generally tends to be used, for example, for on-line game services.

If the "Permission for NW Policy ID" is "02", then this indicates that the permitted network policy is high-speed, guaranteed-bandwidth. High-speed, guaranteed-bandwidth tends to be used for high-capacity services in which even slight latency cannot be permitted, and generally tends to be used, for example, for video distribution services.

If the "Permission for NW Policy ID" is "03", then this indicates that the permitted network policy is low-speed, best-effort. Low-speed, best-effort tends to be used for low-capacity services in which some latency is permissible, and generally tends to be used, for example, for sensor services for the purpose of data collection.

If the "Permission for NW Policy ID" is "04", then this indicates that the permitted network policy is low-speed, guaranteed-bandwidth. Low-speed, guaranteed-bandwidth tends to be used for low-capacity services in which even slight latency cannot be permitted, and generally tends to be used, for example, for real-time monitoring services for the purpose of security.

(Permission for Server Location)

The "Permission for server location" indicates server locations that are permitted as connection destination servers for providing services.

(Other Conditions)

The permission table may further include "Other conditions" relating to communication connections.

Examples of "Other conditions" include time-based connection destination constraint conditions, connection destination priority rankings, time-based network policy constraint conditions, and the like. If the services are game services, then an example is the condition of connecting to an MEC 1 at times during which game events are being held. Additionally, an example is the condition that the connection destination priority ranking be in the order of an MEC 1 and an MEC 2. Additionally, if the service is a monitoring service, then an example is the condition that the network policy "Permission for NW Policy ID" should be changed from "03" to "02" at specific times during which the security level is to be raised.

Returning to the explanation of FIG. 3, in the table in FIG. 3, the record (row) with the management ID "1111" and the record with the management ID "1112" indicate the "NW policy ID" and the "server location" permitted for cases in which the same application, designated by the application ID "0001", is used to connect to different connection destination server application URLs.

The record with the management ID "1111" indicates that, in the case in which the application designated by the application ID "0001" is used to connect to a service-providing application designated by "Connection Destination Server Application URL: xxxxxxx1", the permitted NW policy ID is 01, and the server location is MEC 1 or MEC 2.

The record with the management ID "1112" indicates that, in the case in which the application designated by the application ID "0001" is used to connect to a service-providing application designated by "Connection Destination Server Application URL: xxxxxxx2", the permitted NW policy ID is "03", and the server location is freely selectable. If there are multiple permitted server locations or if they are freely selectable, then this indicates that there may be one or more server locations that are permitted for connections between the application and the service-providing application.

Additionally, the record with the management ID "1111" and the record with the management ID "1112" indicate that, in the case in which the same application designated by the application ID "0001" is used, the "NW policy ID" and the "server location" that are permitted differ depending on the connection destination.

The record with the management ID "1113" indicates that, in the case in which the application designated by the application ID "0002" is used to connect to a service-providing application designated by "Connection Destination Server Application URL: xxxxxxx3", the permitted NW policy ID is 03, and the server location is MEC 3.

The record with the management ID "1114" indicates that, in the case in which the application designated by the application ID "0003" is used to connect to the service-providing application designated by "Connection Destination Server Application URL: xxxxxxx3", the permitted NW policy ID is freely selectable, and the server location is freely selectable. If the permitted NW policy ID is freely selectable, then this indicates that there may be one or more network policies permitted for connections between the application and the service-providing application.

Additionally, the record with the management ID "1113" and the record with the management ID "1114" indicate that, even if the connection destination is the same, in the case in which the applications used when receiving the provided service are different, the "NW policy ID" and the "server location" that are permitted differ depending on the applications.

Thus, the management device 130 prepares a policy file including a permission table.

(Communication Device 140)

Figure 4:
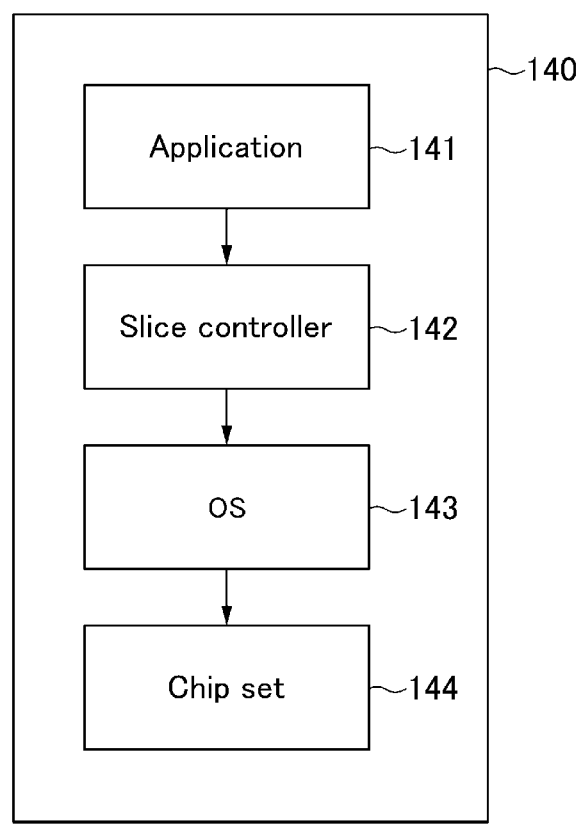
FIG. 4 is a functional block diagram illustrating the structure of a communication device provided with a slice controller according to the present disclosure.

Next, FIG. 4 will be used to explain the communication device 140.

FIG. 4 is a functional block diagram indicating the structure of the communication device 140 according to the present disclosure.

The communication device 140 comprises an application 141, a slice controller 142, an OS 143 (Operation System), and a chip set 144.

As mentioned above, the application 141 is an application that is executed with the communication device 140 in order to receive a provided service. One or more applications 141 may be installed in the communication device 140.

The application 141 notifies the slice controller 142 of requirements for receiving the provided service. The requirements for receiving the provided service include the address (URL) of the service-providing application 113, the network policy when receiving the provided service, and information regarding the location of the server providing the service. The requirements for receiving the provided service will be described below.

In the present disclosure, the slice controller 142 is constructed between the OS 143 and the application 141.

The slice controller 142 selects a slice for receiving the provided service based on the requirements for receiving the provided service, regarding which a notification is provided by the application 141. The slice selection method will be described below.

When a slice is selected, the slice controller 142 generates a communication connection request associated with an application corresponding to the selected slice. Hereinafter, said communication connection request will be described as the "first communication connection request". Details regarding the first communication connection request will be described below.

The slice controller 142 notifies the chip set 144 of the first communication connection request via the OS 143.

Details regarding the operations of the slice controller 142 will be described below.

The OS 143 is located between the slice controller 142 and the chip set 144, and provides an interface for the slice controller 142. Additionally, the OS 143 performs memory management and process management of the chip set 144.

The chip set 144 comprises a CPU (central processing unit) and a GPU (graphics processing unit). The chip set 144 may be a virtual chip set that is realized by software. The chip set 144 manages the correspondence relationships between applications and slices provided in the communication network 110. The correspondence relationships will be described below.

The chip set 144 acquires the aforementioned first communication connection request from the slice controller 142 through the OS 143.

Upon acquiring the first communication connection request, the chip set 144 generates a communication connection request based on the first communication connection request and the correspondence relationships (said correspondence relationships will be described below) between applications and slices provided in the communication network 110. Said communication connection request is a communication connection request that is sent to the communication network 110 for performing communication associated with the application 141 with which the provided service is to be provided via the slice selected by the slice controller 142. Hereinafter, said communication connection request will be described as the "second communication connection request". Thus, in other words, the chip set 144 sends the generated second communication connection request to the communication network 110.

In this way, a request for a slice connection satisfying the requirements for receiving the provided service from the application 141 is made from the chip set 144 to the communication network 110. Thereafter, processing is performed so that the application 141 and the service-providing application 113 are communicatively connected by using a slice satisfying the requirements for receiving the provided service.

(Requirements for Receiving Provided Services)

Next, the requirements for receiving the provided service regarding which the slice controller 142 was notified by the application 141 will be explained.

The requirements for receiving provided services include information such as "Request URL", "NW Policy ID" and "Server location".

The "Request URL" designates the URL (including a header and a body) of a service-providing application 113 with which to connect.

The "NW Policy ID" designates the QoS (Quality of Service), which is the quality of the services provided on the communication network 110. The QoS types may include, for example, QoS1, QoS2, QoS3, and QoS4. QoS1 indicates high-speed, best-effort and is designated by setting the "NW Policy ID" to "01". QoS2 indicates high-speed, guaranteed-bandwidth and is designated by setting the "NW Policy ID" to "02". QoS3 indicates low-speed, best-effort and is designated by setting the "NW Policy ID" to "03". QoS4 indicates low-speed, guaranteed-bandwidth and is designated by setting the "NW Policy ID" to "04". The number of types of QoS is not limited to four.

The "Server location" designates the location of a server with which to connect. The location of the server may, for example, be an MEC or the like provided on a server in an antenna site or an edge data center.

The combinations of the "Request URL", the "NW Policy ID", and the "Server location" included in the requirements for receiving provided services are predetermined for each application 141 in accordance with use cases that are contemplated for the cases in which the application 141 and the service-providing application 113 are connected.

FIG. 5 indicates examples of the correspondence between use cases and the requirements for receiving provided services.

As use cases, optimization, designation of only "NW Policy ID" (QoS), designation of only server location, designation of both QoS and server location, and the like may be contemplated. Optimization refers to the QoS and the server location both not being designated and being freely selectable.

For example, in the case of an automated driving service, the QoS must be high-speed, guaranteed-bandwidth (QoS2).

Additionally, depending on the service, cases in which the QoS is freely selectable but the server location must be designated could be contemplated.

The use cases may differ, depending on the application 141, even when connecting to the same "Request URL". Additionally, even with the same application 141, when it is possible to connect to different "Request URLs", there may be multiple use cases depending on the "Request URL", The application 141 holds, in advance, one or more combinations of information for the "Request URL", the "NW Policy ID" and the "Server location". The application 141 notifies the slice controller 142 of the requirements for receiving provided services, including the URL ("Request URL") of a service-providing application 113 with which to connect, and the "NW Policy ID" and the "Server location" combined with this "Request URL".

(Slice Controller 142)

Next, the structure and operations of the slice controller 142 in the communication device 140 will be explained.

Figures 6, 7:
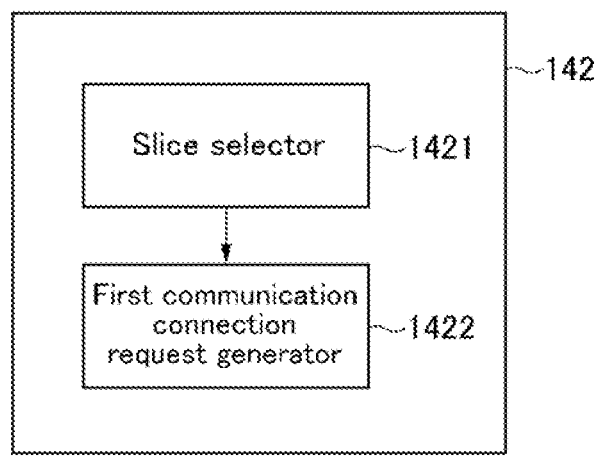
FIG. 6 is a functional block diagram illustrating the structure of a slice controller.
FIG. 7 is a diagram illustrating an example (correspondence table #1) of a correspondence table for server location IDs and NSSAIs.

FIG. 6 is a functional block diagram illustrating the structure of the slice controller 142. The slice controller 142 comprises a slice selector 1421 and a first communication connection request generator 1422. The slice controller 142 is capable of communicating with the management device 130 via the OS 143 and the chip set 144 in the communication device 140.

The slice selector 1421, upon receiving a trigger, notifies the management device 130 of a request to send a policy file. The trigger may, for example, be a signal generated when the slice controller 142 is first activated, when the power of the communication device 140 is turned on, or the like.

The slice selector 1421 acquires a policy file from the management device 130. If there is a policy file that has already been acquired, then the slice selector 1421 updates the permission table based on the newest policy file.

The slice selector 1421 acquires requirements for receiving a provided service from the application 141. As mentioned above, the requirements for receiving the provided service include the "Request URL", the "NW Policy ID", and the "Server location" information.

The slice selector 1421 collates the "Request URL", the "NW Policy ID", and the "Server location" included in the requirements for receiving the provided service with the policy file, and selects a slice satisfying the requirements for receiving the provided service.

Specifically, the slice selector 1421 refers to the permission table and checks the "NW policy ID" (Permission for NW policy ID) and the "Server location" (Permission for server location) that are permitted for the "Connection Destination Server Application URL" designated by the "Request URL". As described below, the slice selector 1421 selects a slice satisfying the permitted "NW policy ID" and "Server location" as the slice.

The manner in which the slice selector 1421 selects a slice in accordance with the "NW Policy ID" and the "Server location" included in the requirements for receiving the provided services will be explained below.

(1) Case in which "NW Policy ID" is "AUTO" and "Server location" is "AUTO"

When the "NW Policy ID" is "AUTO", this means that a QoS is not designated. When the "Server location" is "AUTO", this means that a server is not designated. In other words, when the "NW Policy ID" is "AUTO" and the "Server location" is "AUTO", this means that there are multiple selectable slices (also described as slice candidates).

When there are multiple slice candidates, the slice selector 1421 may select any of the slices. For example, the slice selector 1421 may select the slice with the highest quality from among the multiple slice candidates. In this case, services can be provided to a user at the highest QoS.

Additionally, for example, the slice selector 1421 may select the slice with the lowest quality from among the multiple slice candidates. In this case, services are provided to a user at the lowest QoS, but it is instead possible to suppress consumption of resources in the communication network 110.

Additionally, the slice selector 1421 may select a slice from among the multiple slice candidates based on the status of the communication network 110. The method for selecting a slice based on the status of the communication network 110 will be described below.

(2) Case in which "NW Policy ID" is "AUTO" and "Server Location" is "MEC1 (Designated)"

When the "NW Policy ID" is "AUTO", this means that a QoS is not designated. When the "Server location" is "MEC1", this means that MEC1 is designated as the server.

In this case, the slice selector 1421 filters slices that are capable of connecting with the server (MEC1) designated by the application 141 to extract slice candidates.

FIG. 7 is a diagram illustrating an example of a correspondence table (correspondence table #1) for Server location IDs and NSSAIs. An NSSAI refers to a slice ID, and said correspondence table indicates the NSSAIs of slices capable of connecting with the servers indicated by the Server location IDs. The slice selector 1421 may, for example, use correspondence table #1 as illustrated in FIG. 7 to extract slice candidates. Correspondence table #1 may be prepared in the management device 130 by using deployment information, or may be included in the policy file.

When there are multiple slice candidates, the slice selector 1421 may select a slice in a manner similar to the above-described case in which the "NW Policy ID" is "AUTO" and the "Server location" is "AUTO".

(3) Case in which "NW Policy ID" is "03 (Designated)" and "Server Location" is "AUTO"

When the "NW Policy ID" is "03", this means that low-speed, best-effort is designated as the QoS. When the "Server location" is "AUTO", this means that a server is not designated.

In this case, the slice selector 1421 filters slices to extract slices that are defined to be low-speed, best-effort as the slice candidates.

FIG. 8 is a diagram illustrating an example of a correspondence table (correspondence table #2) for NW Policy IDs and NSSAIs. The slice selector 1421 may, for example, use correspondence table #2 as illustrated in FIG. 8 to extract slice candidates. In correspondence table #2, NW Policy IDs are associated with NSSAIs satisfying the QoS indicated by said NW Policy IDs. Correspondence table #2 may be prepared in the management device 130 by using deployment information, or may be included in the policy file.

When there are multiple slice candidates, the slice selector 1421 may select a slice in a manner similar to the above-described case in which the "NW Policy ID" is "AUTO" and the "Server location" is "AUTO".

(4) Case in which "NW Policy ID" is "03" and "Server Location" is "MEC3 (Designated)"

When the "NW Policy ID" is "03", this means that low-speed, best-effort is designated as the QoS. When the "Server location" is "MEC3", this means that MEC3 is designated as the server.

In this case, the slice selector 1421 selects a slice that is capable of connecting to the MEC3 from among slices defined to be low-speed, best-effort.

The slice selector 1421 may, for example, use the above-mentioned correspondence table #1 and correspondence table #2 to extract slice candidates. For example, from correspondence table #1, it can be understood that the NSSAI of a slice for which the "Server location" is "MEC3" is "3" (filtering result #1). Additionally, from correspondence table #2, it can be understood that the slices in which the "NW Policy ID" is "03" are a slice in which NSSAI is "3" and a slice in which "NSSAI" is "4" (filtering result #2). The slice selector 1421 selects, as the slice satisfying the designated requirements, the slice in which NSSAI is "3", which is included in both filtering result #1 and filtering result #2.

When there are multiple slice candidates included in both filtering result #1 and filtering result #2, the slice selector 1421 may select a slice in a manner similar to the above-described case in which the "NW Policy ID" is "AUTO" and the "Server location" is "AUTO".

That is, when there are multiple slice candidates, the slice selector 1421 may select any of the slices. Additionally, the slice selector 1421 may select the slice with the highest QoS from among the multiple slice candidates. Additionally, the slice selector 1421 may select the slice with the lowest QoS from among the multiple slice candidates.

Additionally, the slice selector 1421 may select a slice from among multiple slice candidates based on the status of the communication network 110. Examples of parameters indicating the status of the communication network 110 include RTT (Round Trip Time), jitter, error rate, and the like. If the communication device 140 is provided with functions for measuring, computing, or acquiring parameters indicating the status of the communication network 110, then the slice selector 1421 can select a slice from among the slice candidates in accordance with the value of a parameter indicating the status of the communication network 110.

For example, the slice selector 1421 selects a slice from among the slice candidates by referring to a switching conditions table including information regarding "NW Policy ID" (Permission for NW Policy ID) and "Server location" (Permission for Server location) that are permitted.

FIG. 9 is a diagram illustrating an example of a switching conditions table. The switching conditions table illustrated in FIG. 9 indicates information regarding the "NW Policy IDs" (Permission for NW Policy ID) and the "Server locations" (Permission for Server location) permitted in accordance with the status of the communication network 110 for the record with the management ID "1114" in the permission table.

For example, it is indicated that, for the record with the management ID "1114", in the case in which the RTT is longer than 5000 ms, the permitted "NW Policy IDs" are "01" and "04", and the permitted "Server locations" are "MEC1" and "MEC2". Additionally, it is indicated that, for the record with the management ID "1114", in the case in which the jitter is longer than 20 ms, the permitted "NW Policy IDs" are "01" and "04", and the permitted "Server locations" are "MEC1" and "MEC2". Additionally, it is indicated that, for the record with the management ID "1114", in the case in which the error rate is greater than 50%, the permitted "NW Policy IDs" are "01" and "04", and the permitted "Server locations" are "MEC1" and "MEC2".

By using the switching conditions table mentioned above, the slice may be changed in the case in which the status of the communication network 110 has deteriorated. For example, suppose that the slice selector 1421 has selected one of the slices to be used for communication with the application having the application ID 0003 based on the record with the management ID "1114" in the permission table in FIG. 3. In this case, if the RTT becomes longer than 5000 ms, the jitter becomes longer than 20 ms, or the error rate becomes greater than 50%, so that the status of the communication network 110 satisfies the switching conditions, then the slice selector 1421 reselects the slice used for communicating with the application having the application ID 0003 based on the switching conditions table.

In this way, the slice selector 1421 may switch the slice when the status of the communication network 110 has deteriorated. Thus, the connection status between the application 141 and the service-providing application 113 can be improved, thereby suppressing deterioration of the usability by users. The slice selector 1421 may, for example, determine the status of the communication network 110 under which the slice is or is not to be switched in accordance with a comparison result between a parameter indicating the status of the communication network 110 and a set threshold value. When a slice is selected, the slice selector 1421 notifies the first communication connection request generator 1422 of the NSSAI of the selected slice.

Returning to the explanation of FIG. 6, the operations of the first communication connection request generator 1422 will be explained. The first communication connection request generator 1422 generates a first communication connection request. The first communication connection request, as mentioned above, is a connection request associated with the application corresponding to the slice selected by the slice selector 1421. In order to generate the first communication connection request, the first communication connection request generator 1422, for example, refers to a correspondence table defining the correspondence between NSSAIs and application IDs. The first communication connection request generator 1422 extracts, from the correspondence table, the application ID corresponding to the NSSAI of the slice selected by the slice selector 1421. Furthermore, the first communication connection request generator 1422 generates a first communication connection request including the extracted application ID.

FIG. 10 is a diagram illustrating an example of a correspondence table defining the correspondence between NSSAIs and application IDs. In the case in which the NSSAI identifying a selected slice is "1", the first communication connection request generator 1422 refers to the correspondence table in FIG. 10 and generates a first communication connection request including information indicating that the "application ID" is "a0001". In the case in which the NSSAI identifying the selected slice is "2", the first communication connection request generator 1422 refers to the correspondence table in FIG. 10 and generates a first communication connection request including information indicating that the "application ID" is "a0002". In the case in which the NSSAI identifying the selected slice is "3", the first communication connection request generator 1422 refers to the correspondence table in FIG. 10 and generates a first communication connection request including information indicating that the "application ID" is "a0003".

The correspondence relationships between NSSAIs and application IDs to which the first communication connection request generator 1422 refers are the same as the correspondence relationships between the application IDs and the NSSAIs to which the chip set 144 refers. In other words, the first communication connection request includes an identifier identifying an application corresponding to the selected slice indicated by the correspondence relationships between the applications 141 and the slices provided in the communication network 110, which are managed by the chip set 144.

The first communication connection request generator 1422 notifies the chip set 144 of the first communication connection request.

(Operations of Communication System 100)

Figure 11A:
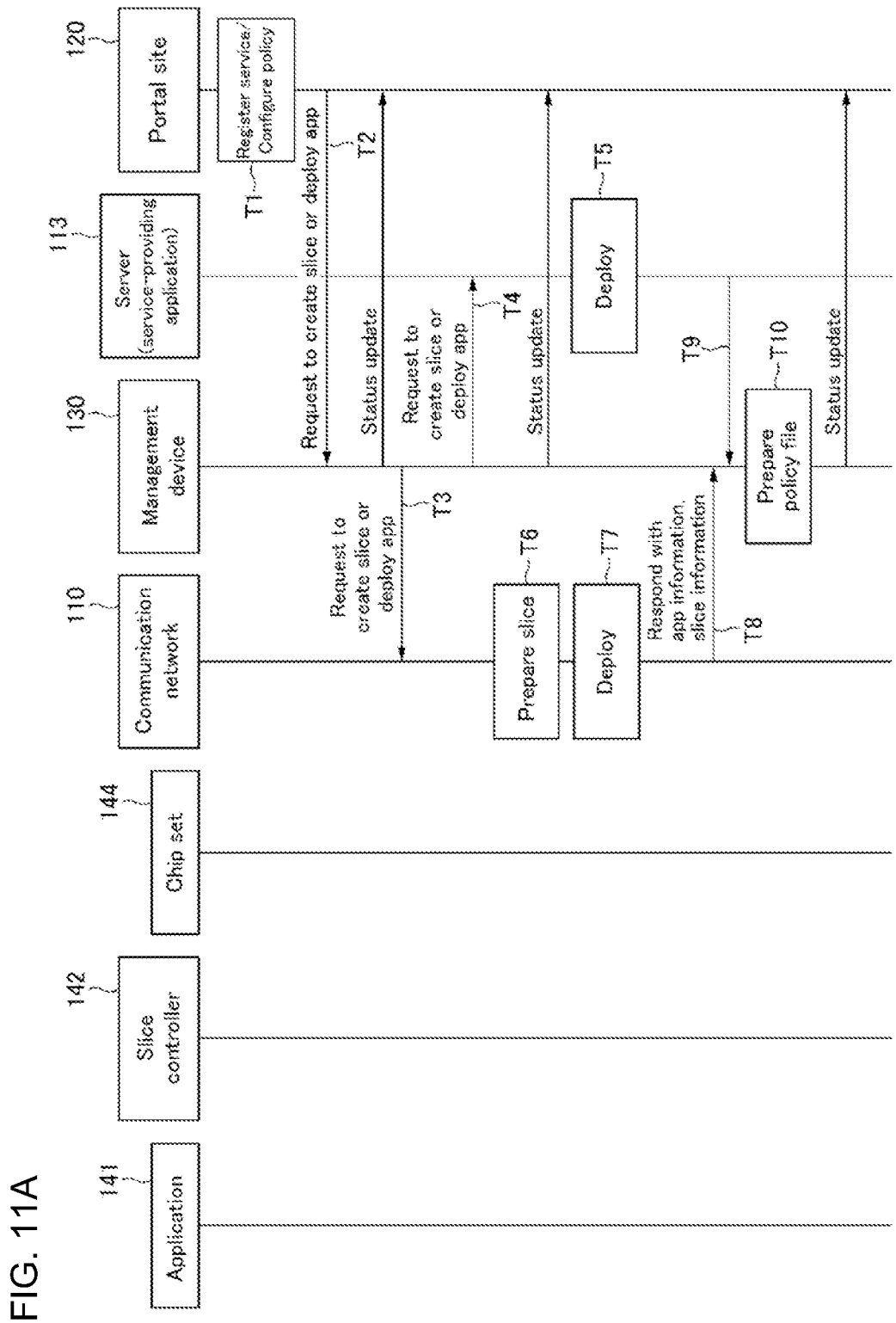
FIG. 11A is a diagram illustrating an example of a processing sequence in the communication system according to the present disclosure.
Figure 11B:
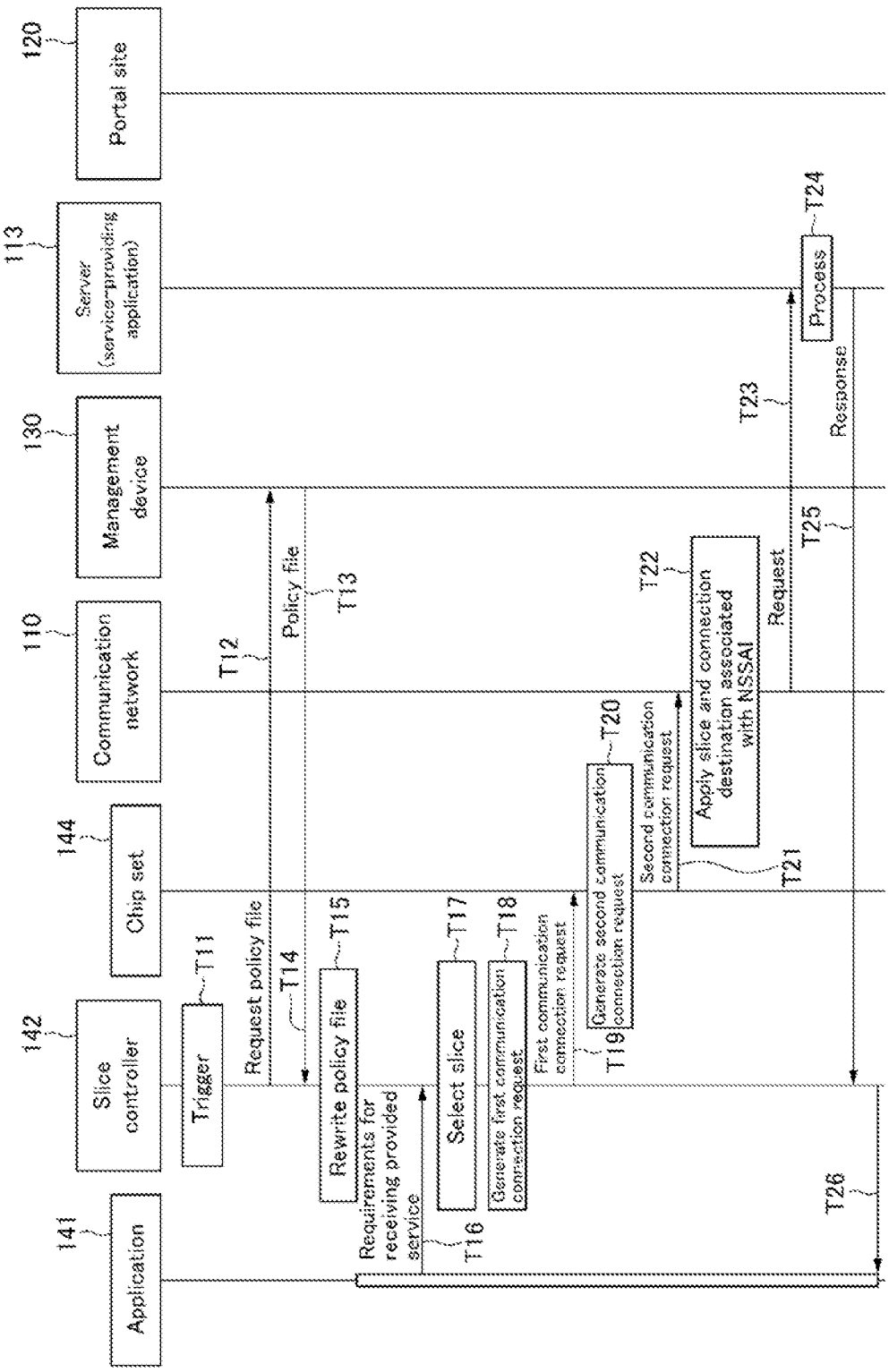
FIG. 11B is a diagram illustrating an example of a processing sequence in the communication system according to the present disclosure.

Next, FIG. 11A and FIG. 11B will be used to explain the operations of the communication system 100 according to the present disclosure. FIG. 11A and FIG. 11B are diagrams illustrating an example of the processing sequence in the communication system 100 according to the present disclosure.

As illustrated in FIG. 11A, the portal site 120 registers a service and configures a policy for the service (T1). The registration and configuration are triggered, for example, by a request from a vendor providing the service. Additionally, the portal site 120 requests the management device 130 to prepare a slice and to deploy a service-providing application 113 (T2).

The management device 130 requests the communication network 110 to prepare a slice in accordance with the policy (T3). The management device 130 requests a server to deploy the service-providing application 113 (T4).

The server that has received the request deploys the service-providing application 113 (T5), and the communication network 110 prepares a slice (T6) and deploys what is necessary to prepare the slice (T7). The management device 130 acquires, from the communication network 110 and the server in which the service-providing application 113 was deployed, information regarding the results of slicing and deployment (T8 and T9).

The management device 130 prepares a policy file including a permission table (T10).

Next, as illustrated in FIG. 11B, a slice controller 142, triggered by the slice controller 142 first being activated by the power supply to the communication device 140 being switched on, or the like (T11), notifies the management device 130 of a request to send the policy file (T12).

The management device 130 sends the policy file to the slice controller 142 (T13).

The slice controller 142 acquires the policy file from the management device 130 (T14). If there is a policy file that has already been acquired, then the slice controller 142 updates the policy file (T15).

The slice controller 142 acquires the requirements for receiving the provided service from the application 141 (T16).

The slice controller 142 refers to the policy file and selects a slice satisfying the requirements for receiving the provided service (T17).

The slice controller 142 generates a first communication connection request including an application ID corresponding to an NSSAI that identifies the selected slice (T18), and notifies the chip set 144 of the first communication connection request (T19).

The chip set 144, upon acquiring the first communication connection request from the slice controller 142, generates a second communication connection request (T20), and sends the second communication connection request to the communication network 110 (T21).

The communication network 110 implements processing for communicating with the slice having the NSSAI indicated by the second communication connection request (T22), and as a result thereof, the request to the service-providing application 113 is sent via said slice (T23).

The connection destination server implements a process for providing the service (T24) and returns, to the communication device 140, a response in accordance with the process (T25). Said response is received by the slice controller 142 via the chip set 144, and the slice controller 142 sends said response to the application 141 with which the provided service is to be received (T26). As a result thereof, the application 141 can receive the provided service by using a slice that is not supposed to be used under the correspondence relationships between the application IDs and the NSSAI managed by the chip set 144.

As described above, the communication device 140 according to the present disclosure comprises a slice controller 142. The slice controller 142 comprises a slice selector 1421 and a first communication connection request generator 1422. The slice selector 1421, upon acquiring the requirements for receiving the provided service to connect the application 141 with the service-providing application 113, refers to the policy file and selects a slice satisfying the requirements for receiving the provided service. The first communication connection request generator 1422 generates a first communication connection request that is associated with the application corresponding to the selected slice and not with the preferred application 141 with which the provided service is to be received via the communication network 110. Specifically, the first communication connection request generator 1422 generates the first communication connection request including an application ID corresponding to the NSSAI identifying the selected slice. The first communication connection request generator 1422 notifies the chip set 144 of the first communication connection request.

By employing the features described above, slices can be dynamically configured, and the usability for users can be improved.

In contrast therewith, until now, connection was only possible by means of a uniquely determined slice in accordance with the application 141 to be used for receiving a provided service. For this reason, if the application 141 was, for example, a web browser, then the same web browser could not be used for communicating with a high QoS and for communicating with a low QoS, and the slice could not be dynamically configured. Supposing that the slices were to be managed in the applications 141, each application 141 would need to manage the selection logic used to select the slice, the connection destination list, the NSSAI, and the like, thus complicating matters. Additionally, when the correspondence relationships between application IDs and NSSAI to which the chip set 144 refers are changed, the implementation of the application 141 would also need to be changed. Additionally, when the same service is used by multiple applications 141, the same implementation must be performed in the multiple applications 141.

Additionally, with the communication device 140 according to the present disclosure, the application 141 simply needs to notify the slice controller 142 of the requirements for receiving the provided service, including the network policy for receiving the provided service and information on the location of the server that is to provide the service. Thereafter, slice selection is performed in the slice controller 142 so that the application 141 and the service-providing application 113 are connected by a slice satisfying the requirements for receiving the provided service. For this reason, the application 141 does not need to consider the slice. Additionally, when the correspondence relationships between the application IDs and the NSSAIs to which the chip set 144 refers are changed, only said correspondence relationships to which the slice controller 142 refers need to be changed.

Additionally, with the communication device 140 according to the present disclosure, slices can be dynamically configured without changing the design of the chip set 144. According to Non-Patent Document 1, the chip set 144 is designed to acquire an identifier (corresponding to the application ID) for identifying the service from the application 141 via the OS 143. The chip set 144 refers to pre-defined correspondence relationships between application IDs and NSSAIs, and sends, to the communication network 110, a second communication connection request including the NSSAI corresponding to the application ID.

The slice controller 142 according to the present disclosure uses the same correspondence relationships as the correspondence relationships to which the chip set 144 refers. Therefore, the chip set 144 does not need to undergo a design change.

(Operations in Slice Controller 142)

Figure 12:
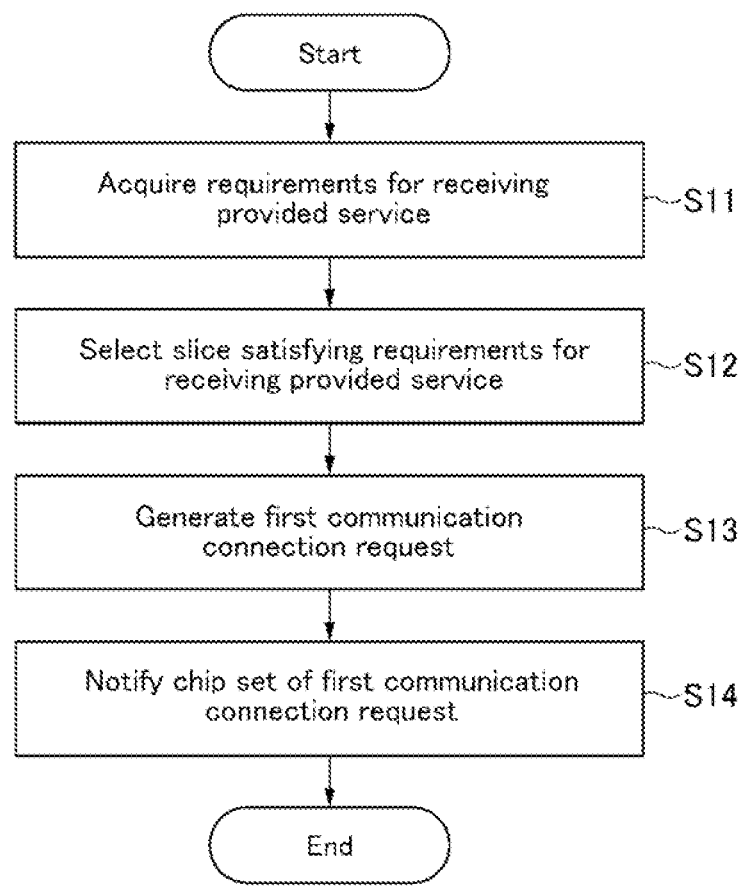
FIG. 12 is a flow chart for explaining the operations in the slice controller illustrated in FIG. 6.

Next, the flow chart in FIG. 12 will be used to explain the operations in the slice controller 142.

The slice controller 142 acquires, from the application 141, the requirements for receiving the provided service in order to connect with the service-providing application 113 (S11). The requirements for receiving the provided service include information regarding the network policy for receiving the provided service and the location of the server that provides the service.

The slice controller 142 refers to the policy file and selects a slice satisfying the requirements for receiving the provided service (S12). The policy file includes information regarding network policies and server locations permitted for the connection between the application 141 and the service-providing application 113.

In S12, if there are multiple slices satisfying the requirements for receiving the provided service, then the slice controller 142 may select a slice freely. Additionally, in S12, if there are multiple slices satisfying the requirements for receiving the provided service, then the slice controller 142 may select the slice with the highest quality. Additionally, in S12, if there are multiple slices satisfying the requirements for receiving the provided service, then the slice controller 142 may select the slice with the lowest quality.

Additionally, in S12, if the policy file includes one or more slice switching conditions and at least one of the slice switching conditions is satisfied, then the slice controller 142 may switch the slice. Additionally, the slice switching conditions may define a relation between the status of the communication network 110 and a switching condition threshold value, and the slice controller 142 may switch the slice in accordance with a comparison result between the status of the communication network 110 and the switching condition threshold value. The status of the communication network 110 may include at least one index indicating the status, such as the RTT (Round Trip Time), the jitter, and the error rate.

The slice controller 142 generates a first communication connection request. The first communication connection request includes an application ID identifying an application corresponding to the selected slice (S13).

The slice controller 142 notifies the chip set 144 of the first communication connection request (S14). The chip set 144 is configured to send, to the communication network 110, a second communication connection request for connecting with a slice. The second communication connection request includes NSSAI information corresponding to the application ID included in the first communication connection request.

(Slice Selection)

Figure 13:
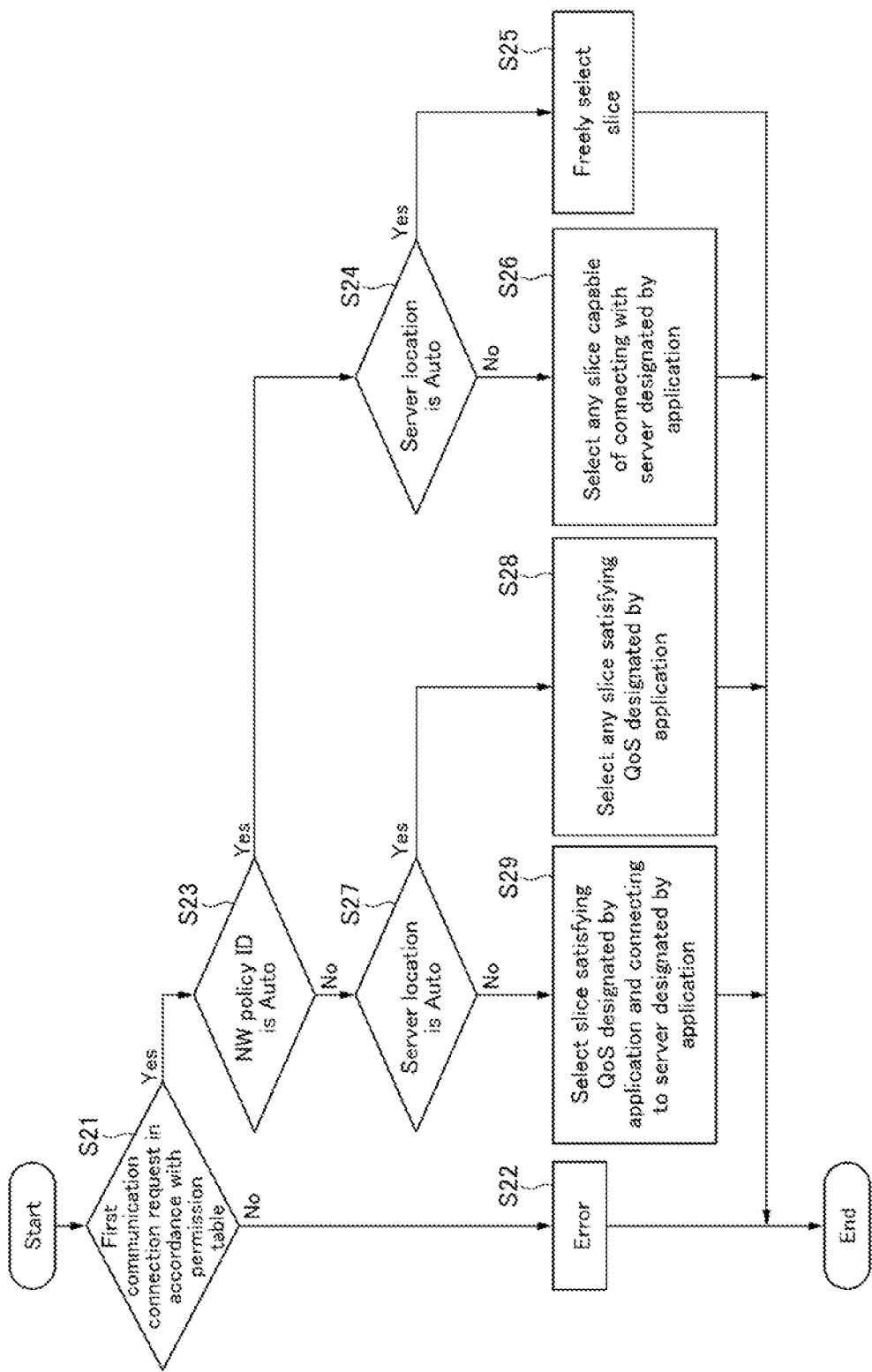
FIG. 13 is a flow chart for explaining the slice selection method in the slice controller.

The method for selecting the slice in the slice controller 142 will be explained by using the flow chart in FIG. 13.

The slice controller 142 checks whether or not the requirements for receiving the provided service acquired from the application 141 is a request in accordance with the permission table (S21). In other words, it checks whether or not the requirements for receiving the provided service include "Request URL", "Server location", and "NW Policy ID" information. Furthermore, in S21, the slice controller 142 may check whether or not there is a combination of "Request URL", "Server location", and "NW Policy ID" included in the requirements for receiving the provided service in the permission table.

If the requirements for receiving the provided service are not a request in accordance with the permission table, then the slice controller 142 determines that an error has occurred, and the flow is terminated (S22). Additionally, if the permission table does not contain the combination of "Request URL", "Server location", and "NW Policy ID" included in the requirements for receiving the provided service, then the slice controller 142 also determines that an error has occurred, and the flow is terminated (S22). If the slice controller 142 determines that an error has occurred, then it may notify the application 141 of the error.

If a request has requirements for receiving the provided service that are in accordance with the permission table, then the slice controller 142 checks whether or not the "NW Policy ID" is "Auto" (S23).

If the "NW Policy ID" is "Auto", then the slice controller 142 checks whether or not the "Server location" is "Auto" (S24).

If the "Server location" is "Auto", then the slice controller 142, for example, selects a slice freely (S25).

If the "Server location" is not "Auto", then the slice controller 142 selects one of the slices that is capable of connecting with the server designated by the application 141 (S26).

If the "NW Policy ID" is not "Auto", then the slice controller 142 checks whether or not the "server location" is "Auto" (S27).

If the "Server location" is "Auto", then the slice controller 142 selects one of the slices satisfying the QoS designated by the application 141 (S28).

If the "Server location" is not "Auto", then the slice controller 142 selects a slice that satisfies the QoS designated by the application 141 and that connects to the server designated by the application 141 (S29).

(Structure of Communication Device 140)

Figure 14:
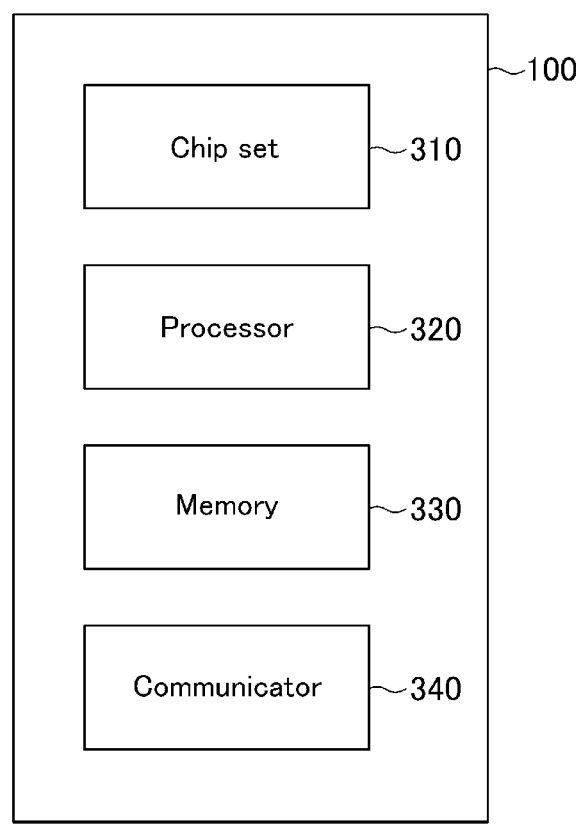
FIG. 14 is a block diagram illustrating an example of the structure of the communication device illustrated in FIG. 4.

FIG. 14 is a block diagram illustrating an example of the structure of the communication device 140 illustrated in FIG. 4.

The communication device 140 comprises a chip set 310, a processor 320, a memory 330, and a communicator 340. The communication device 140 may also comprise one or more processors 320 and memories 330.

The chip set 310 performs the processes in the chip set 144 illustrated in FIG. 4. The chip set 310 may be a virtual chip set that is realized by software.

The processor 320 operates the memory 330 and the communicator 340, and the processor 320 also performs the processes in the slice controller 142 illustrated in FIG. 4. That is, the slice controller 142 is realized by the processor 320.

The memory 330, for example, stores policy files. A program that is read for the processor 320 to realize the slice controller 142 may be stored in a non-volatile manner in the memory 330. Alternatively, the program may be stored in a non-volatile manner in an external storage medium, and the program may also be temporarily stored in the memory 330 to allow the program to be read by the processor 320.

The communicator 340 exchanges data with the application 141 and the OS 143 illustrated in FIG. 4.

The communication device 140 may further include other structures that are not illustrated.

As mentioned above, the communication device 140 according to the present disclosure includes a chip set 310 and one or more processors 320. The chip set 310 manages correspondence relationships between applications and slices provided in the communication network. The chip set 310, upon acquiring a first communication connection request, sends, to the communication network, a second communication connection request based on the correspondence relationships. The first communication connection request is a connection request for receiving the provided service via the communication network 110. The second communication connection request is a connection request for performing, via a corresponding slice, communication associated with the application with which the provided service is to be received.

The one or more processors acquire, from a preferred application with which the provided service is to be received via the communication network 110, requirements for receiving the provided service. The one or more processors refer to a policy file to select a slice satisfying the requirements for receiving the provided service from among one or more slices provided in the communication network 110. The one or more processors generate the first communication connection request associated with an application corresponding to the selected slice and not with the preferred application with which the provided service is to be received via the communication network 110. The one or more processors notify the chip set of the generated first communication connection request.

By employing the features described above, a process for connecting to a slice satisfying a desired policy is performed, and slices can be dynamically configured. As a result thereof, the usability for users can be improved.

Additionally, a policy that can be permitted between the application 141 and the service-providing application 113 is configured in the policy file. Therefore, a slice not satisfying a permitted policy will not be selected. In other words, restrictions can be placed on the connections between the application 141 and the service-providing application 113.

Additionally, in the policy file, a network policy and a server location that are permitted for connections between the application 141 and the service-providing application 113 can be configured. For this reason, for example, the slice can also be changed in accordance with the status of the communication network 110.

The present disclosure is not limited to the structures mentioned above, and the present disclosure also includes a program. That is, a program that, when read by a computer, makes one or more processors in the computer execute the slice configuration method of the present disclosure is also included in the present disclosure. Additionally, a non-transitory, computer-readable medium having the above-mentioned program recorded therein is also included in the present disclosure.

The present disclosure includes the following embodiments.

[1] A communication device comprising:
a chip set that is configured to manage correspondence relationships between applications and slices provided in a communication network, and upon acquiring a first communication connection request for receiving a provided service via the communication network, to send, to the communication network, a second communication connection request for performing, via a corresponding slice, communication associated with an application with which the provided service is to be received, based on the correspondence relationships; and
one or more processors;
wherein
the one or more processors execute processes of
acquiring, from a preferred application with which the provided service is to be received via the communication network, a requirement for receiving the provided service, and referring to a policy file to select a slice satisfying the requirement from among one or more slices provided in the communication network,
generating the first communication connection request associated with an application corresponding to the selected slice and not with the preferred application with which the provided service is to be received via the communication network, and
notifying the chip set of the generated first communication connection request.

[2] The communication device according to [1], wherein
the policy file includes information regarding a network policy and a server location that are permitted for a connection between the application with which the provided service is to be received and a service-providing application executed on a server for providing the service.

[3] The communication device according to [2], wherein
the requirement includes information regarding an address of the service-providing application, a network policy for receiving the provided service, and a location of the server for providing the service.

[4] The communication device according to any one of [1] to [3], wherein
the first communication connection request includes an identifier for identifying an application corresponding to the selected slice among the correspondence relationships managed by the chip set.

[5] The communication device according to any one of [2] to [4], wherein
there are one or more network policies that are permitted for the connection between the application with which the provided service is to be received and the service-providing application.

[6] The communication device according to any one of [2] to [5], wherein
there are one or more server locations that are permitted for the connection between the application with which the provided service is to be received and the service-providing application.

[7] The communication device according to any one of [1] to [6], wherein
selecting the slice means selecting a slice freely when there are multiple slices satisfying the requirement.

[8] The communication device according to any one of [1] to [6], wherein
selecting the slice means selecting the slice with the highest quality when there are multiple slices satisfying the requirement.

[9] The communication device according to any one of [1] to [6], wherein
selecting the slice means selecting the slice with the lowest quality when there are multiple slices satisfying the requirement.

[10] The communication device according to any one of [1] to [9], wherein
the policy file further includes one or more slice switching conditions, and
the one or more processors further execute a process of switching the slice when at least one of the slice switching conditions is satisfied.

[11] The communication device according to [10], wherein
in the slice switching conditions, a relation is defined between a status of the communication network and a switching condition threshold value, and
the one or more processors further execute a process of switching the slice in accordance with a comparison result between the status of the communication network and the switching condition threshold value.

[12] The communication device according to [11], wherein
the status of the communication network includes at least one of RTT (Round Trip Time), jitter, and error rate.

[13] The communication device according to any one of [1] to [12], wherein
the policy file is prepared or updated when requesting to register for a service, when requesting an update, or periodically.

[14] The communication device according to any one of [1] to [13], wherein
the chip set is a virtual chip set that is realized by software.

[15] A slice configuration method that involves
acquiring, from a preferred application with which a provided service is to be received via a communication network, a requirement for receiving the provided service, and referring to a policy file to select a slice satisfying the requirement from among one or more slices provided in the communication network,
generating a first communication connection request associated with an application corresponding to the selected slice and not with the preferred application with which the provided service is to be received via the communication network, and
notifying a chip set of the generated first communication connection request, the chip set being configured to manage correspondence relationships between applications and slices provided in the communication network, and upon acquiring the first communication connection request for receiving the provided service via the communication network, to send, to the communication network, a second communication connection request for performing, via a corresponding slice, communication associated with the application with which the provided service is to be received, based on the correspondence relationships.

[16] A non-transitory, computer-readable medium having, recorded therein, a program that, when read by a computer, makes one or more processors in the computer execute processes of:
acquiring, from a preferred application with which a provided service is to be received via a communication network, a requirement for receiving the provided service, and referring to a policy file to select a slice satisfying the requirement from among one or more slices provided in the communication network,
generating a first communication connection request associated with an application corresponding to the selected slice and not with the preferred application with which the provided service is to be received via the communication network, and
notifying a chip set of the generated first communication connection request, the chip set being configured to manage correspondence relationships between applications and slices provided in the communication network, and upon acquiring the first communication connection request for receiving the provided service via the communication network, to send, to the communication network, a second communication connec-
tion request for performing, via a corresponding slice, communication associated with the application with which the provided service is to be received, based on the correspondence relationships.

REFERENCE SIGNS LIST

100 Communication system
111 RAN (Radio Access Network)
112 CN (Core Network)
113 Service-providing application
110 Communication network
120 Portal site
130 Management device
140 Communication device
141 Application
142 Slice controller
1421 Slice selector
1422 First communication connection request generator
143 OS (Operation System)
144 Chip set
210 Antenna site
220 Edge data center
230 RDC (Regional Data Center)
240 CDC (Central Data Center)
250 PDC (Public Data Center)
310 Chip set
320 Processor
330 Memory
340 Communicator

The invention claimed is:

1. A communication device comprising:
a chip set that is configured to manage correspondence relationships between applications and slices provided in a communication network, and upon acquiring a first communication connection request for receiving a provided service via the communication network, to send, to the communication network, a second communication connection request for performing, via a corresponding slice, communication associated with an application with which the provided service is to be received, based on the correspondence relationships; and
one or more processors;
wherein
the one or more processors execute processes of
acquiring, from a preferred application with which the provided service is to be received via the communication network, a requirement for receiving the provided service, and referring to a policy file to select a slice satisfying the requirement from among one or more slices provided in the communication network,
generating the first communication connection request associated with an application corresponding to the selected slice, the first communication request being independent from the preferred application with which the provided service is to be received via the communication network, and
notifying the chip set of the generated first communication connection request.

2. The communication device according to claim 1, wherein
the policy file includes information regarding a network policy and a server location that are permitted for a connection between the application with which the provided service is to be received and a service-providing application executed on a server for providing the service.

3. The communication device according to claim 2, wherein
the requirement includes information regarding an address of the service-providing application, a network policy for receiving the provided service, and a location of the server for providing the service.

4. The communication device according to claim 1, wherein
the first communication connection request includes an identifier for identifying an application corresponding to the selected slice among the correspondence relationships managed by the chip set.

5. The communication device according to claim 2, wherein
there are one or more network policies that are permitted for the connection between the application with which the provided service is to be received and the service-providing application.

6. The communication device according to claim 2, wherein
there are one or more server locations that are permitted for the connection between the application with which the provided service is to be received and the service-providing application.

7. The communication device according to claim 1, wherein
selecting the slice means selecting a slice freely when there are multiple slices satisfying the requirement.

8. The communication device according to claim 1, wherein
selecting the slice means selecting the slice with the highest quality when there are multiple slices satisfying the requirement.

9. The communication device according to claim 1, wherein
selecting the slice means selecting the slice with the lowest quality when there are multiple slices satisfying the requirement.

10. The communication device according to claim 1, wherein
the policy file further includes one or more slice switching conditions, and
the one or more processors further execute a process of switching the slice when at least one of the slice switching conditions is satisfied.

11. The communication device according to claim 10, wherein
in the slice switching conditions, a relation is defined between a status of the communication network and a switching condition threshold value, and
the one or more processors further execute a process of switching the slice in accordance with a comparison result between the status of the communication network and the switching condition threshold value.

12. The communication device according to claim 11, wherein
the status of the communication network includes at least one of RTT (Round Trip Time), jitter, and error rate.

13. The communication device according to claim 1, wherein
the policy file is prepared or updated when requesting to register for a service, when requesting an update, or periodically.

14. The communication device according to claim 1, wherein
the chip set is a virtual chip set that is realized by software.

15. A slice configuration method that involves:
acquiring, from a preferred application with which a provided service is to be received via a communication network, a requirement for receiving the provided service, and referring to a policy file to select a slice satisfying the requirement from among one or more slices provided in the communication network;
generating a first communication connection request associated with an application corresponding to the selected slice, the first communication connection request being independent from the preferred application with which the provided service is to be received via the communication network; and
notifying a chip set of the generated first communication connection request, the chip set being configured to manage correspondence relationships between applications and slices provided in the communication network, and upon acquiring the first communication connection request for receiving the provided service via the communication network, to send, to the communication network, a second communication connection request for performing, via a corresponding slice, communication associated with the application with which the provided service is to be received, based on the correspondence relationships.

16. A non-transitory, computer-readable medium having, recorded therein, a program that, when read by a computer, makes one or more processors in the computer execute processes of:
acquiring, from a preferred application with which a provided service is to be received via a communication network, a requirement for receiving the provided service, and referring to a policy file to select a slice satisfying the requirement from among one or more slices provided in the communication network;
generating a first communication connection request associated with an application corresponding to the selected slice, the first communication request being independent from the preferred application with which the provided service is to be received via the communication network; and
notifying a chip set of the generated first communication connection request, the chip set being configured to manage correspondence relationships between applications and slices provided in the communication network, and upon acquiring the first communication connection request for receiving the provided service via the communication network, to send, to the communication network, a second communication connection request for performing, via a corresponding slice, communication associated with the application with which the provided service is to be received, based on the correspondence relationships.

* * * * *